United States Patent [19]
Werneke

[11] 3,717,574
[45] Feb. 20, 1973

[54] FLOCCULATION OF COAL SLIMES

[75] Inventor: Michael Francis Werneke, Stamford, Conn.

[73] Assignee: American Cyanamid Company, Stamford, Conn.

[22] Filed: Sept. 21, 1971

[21] Appl. No.: 182,519

[52] U.S. Cl....................................210/53, 209/5
[51] Int. Cl. .................................C02b 1/20
[58] Field of Search....................210/52–54; 209/5

[56] References Cited

UNITED STATES PATENTS 3,079,331  2/1963  Gieseke..................................210/53
3,493,499  2/1970  Zeitoun et al. .....................210/53 X Primary Examiner—Michael Rogers
Attorney—Evans Kahn

[57] ABSTRACT

Colloidal coal particles in aqueous alkaline medium are flocculated by the combined action of a low molecular weight water-soluble anionic polymer at least 50 mol percent composed of acrylic acid linkages and a high molecular weight anionic polymer at least 95 mol percent composed of acrylamide linkages, and adjusting the pH of the aqueous medium to a value below 7. A water-soluble anionic starch may be added as supplementary flocculant.

10 Claims, No Drawings

FLOCCULATION OF COAL SLIMES

The present invention relates to a process for flocculating colloidal coal particles in aqueous alkaline medium. The invention includes a process for clarifying water containing colloidal coal by flocculating the coal colloids by addition of a pair of flocculating agents and, then removing the flocculated colloids from the aqueous medium.

At the present time it is common practice to supply coal-burning electric generating plants with fuel by fluidized transport of the coal. According to this method, coal is pulverized and formed into an aqueous slurry at the mine. The slurry is pumped through a pipeline to the electric generating plant, the coal is separated from the aqueous medium of the slurry (usually by a cyclone separator, see U.S. Pat. No. 2,648,433), the aqueous underflow from the separator is discharged into a nearby river, lake or arm of the ocean, and the coal is dried and fed into the burners.

A disadvantage of the process is that most solid separators are incapable of removing coal particles of colloidal size. Hence, the effluent normally contains its full complement of of colloidal coal which is a significantly large amount. Typically it amounts to 3–5 percent of the weight of the water, and in instances has been as much as 10% of the weight of the water. Recent legislation had made the discharge of this type of fluid (which is jet black in color) into streams and lakes an illegal act of pollution, and a demand has arisen for a process which will remove this colloidal coal leaving a substantially clean aqueous phase. Absent the coal, the liquid phase is essentially water having a mildly alkaline pH (7.5–8.5) and is non-polluting.

A process for flocculating colloidal coal in aqueous suspension is disclosed in C. A. 65, 19885–19886 (1966). In this process a solution of polyacrylamide containing 14 percent of ammonium sulfate is added to the suspension to be clarified and the pH is decreased to 3.0–5.6. However, this process fails to flocculate all of the coal colloids. The effluent contains sufficient colloidal coal so that when viewed in bulk it is black in color, and qualifies as a pollutant.

The discovery has now been made that substantially all of the colloidal coal is flocculated when the effluent is rendered acid and is treated with two specific water-soluble anionic flocculants. One flocculant is a low molecular weight polymer which is strongly anionic. It is at least about 50 mol percent composed of acrylic acid linkages and has a molecular weight between about 50,000 and 500,000.

The second flocculant is a weakly anionic vinyl polymer which is of very high molecular weight. It is at least 95 mol percent composed of acrylamide, contains a sufficient number of vinyl acid linkages so that the polymer possesses a net anionic charge, and has a molecular weight in excess of 5 million. The higher its molecular weight, the greater is its efficiency. By the use of these polymers in combination it has been possible in the laboratory to flocculate substantially all of the colloidal coal in a typical aqueous medium, so that the supernatant phase (the medium remaining after the flocculated coal has settled) is substantially as clear as pure water.

The low molecular weight polymer can be polyacrylic acid itself, or be composed of acrylic acid and non-cationic linkages compatible therewith, for example, vinyl alcohol, acrylonitrile, allyl sulfonamide, allyl alcohol, allyl sulfonic acid, and acrylamide linkages. Minor amounts of hydrophobic linkages such as methyl acrylate, vinyl acetate, styrene, p-chloromethyl styrene, and ethylene linkages may be present in the polymer so long as they are present in sufficiently small amount so as not to alter the essentially water-soluble hydrophilic and anionic character of the polymer. Very satisfactory results have been achieved with the 30:70 molar ratio acrylamide:acrylic acid polymer having a molecular weight of about 200,000 and this polymer is therefore preferred.

The high molecular weight polymer preferably is composed of acrylamide and vinyl acid linkages, the number of of the latter linkages being no larger than is necessary to impart a net anionic charge to the polymer. The polymer thus is composed of acrylamide and acrylic acid or allyl sulfonic acid linkages in molar ratio of at least about 95:5 and preferably in excess of 99:1, and having a molecular weight as high as is practical, for example a molecular weight in the range of 10 to 15 million. However, such polymers provide useful results when they contain minor percentages of linkages such as are mentioned in the paragraph above, and the step of employing such polymers in the process is within the scope of the present invention.

The polymers used herein are prepared by known methods, if desired by copolymerization of mixtures of the indicated monomers.

I have further found that water-soluble anionic starch acts as auxiliary flocculant with the low molecular weight polymer. According to the invention, therefore, an aqueous solution of the starch is added along with the low molecular weight polymer (or in admixture therewith) in effective amount, for example between 10 and 100 parts of the starch per million parts by weight of the coal suspension.

Coal in freshly pulverized state is normally alkaline, and the coal suspensions referred to above typically have a pH in the range of 7.5–8.5. In the process of the present invention the pH of the aqueous medium is adjusted to an acid pH (preferably 6.5 to 6.9) during, after, but preferably before addition of the polymers.

The polymers are preferably added as aqueous solutions having a solids content of 1–5 percent to facilitate metering. In the description above, the term "vinyl acid linkages" includes acrylic acid, allylsulfonic acid, etc. linkages both in free acid and in soluble salt states.

The polymers may be added separately, but most conveniently are pre-mixed and metered into the effluent as one solution. Best results per unit weights of the polymers added are obtained when the low molecular weight polymer is added prior to the higher molecular weight polymer.

The invention is more particularly described in the example which follows. This example illustrates the invention and is not to be construed in limitation thereof.

EXAMPLE 1

The following illustrates the process of the present invention as applied to the flocculation of colloidal coal in the effluent from the fluidized transport of bituminous coal after the over-sized particles have been removed therefrom by centrifugation.

The effluent is a jet black mobile fluid containing 3.35 percent by weight of colloidal bituminous coal particles and has a pH of 7.35.

In each instance, the test is performed by taking a 50 cc. sample of the suspension, adjusting the pH to 6.5 by addition of dilute sulfuric acid and then adding a solution of a 30:70 molar ratio acrylamide:acrylic acid copolymer having a molecular weight of 200,000 followed by an aqueous solution of a 99:1 acrylamide:acrylic acid copolymer having a molecular weight of about 12–15 million. The test tube is inverted after each addition to ensure uniform distribution of the polymer therethrough.

The test tube is then allowed to stand for 2 hours at the end of which time the height of the supernatant layer is measured and also the turbidity of this supernatant layer is determined by means of a laboratory turbidimeter.

Control tests are run on the suspension as supplied, on the suspension with addition of sulfuric acid (but without addition of polymer) and with addition of sulfuric acid and each of the polymers.

Results are as follows:

| Run No. | pH of Suspension Start | pH of Suspension After $H_2SO_4$ | Amount of Polymer Added, p.p.m. Low 30:70 | Amount of Polymer Added, p.p.m. High 99:1 | Supernatant Layer After 2 Hours Height, Inches | Supernatant Layer After 2 Hours Turbidity p.p.m. |
|---|---|---|---|---|---|---|
| A | 7.4 | — | —[b] | —[b] | 0 | Black |
| B | 7.4 | 6.5 | —[b] | —[b] | 0 | Do. |
| C | 7.4 | 6.5 | 20 | —[b] | 1.5 | 400 |
| D | 7.4 | 6.5 | —[b] | 20 | 0.25 | Black[c] |
| E | 7.4 | —[a] | 12 | 8 | 2.5 | Do.[c] |
| 1 | 7.4 | 6.5 | 12 | 8 | 2.5 | 150 |
| 2 | 7.4 | 6.5 | 14 | 6 | 2.25 | 90 | a. No acid added.
b. No polymer added.
c. Solids content in excess of 1,000 p.p.m.

The results show that while a practically useful amount of clarification was achieved in the best of the control runs (run C) far superior clarification was achieved by the interaction of the two polymers.

EXAMPLE 2

The procedure of run 2 of Example 1 is repeated except that sufficient of a 4% aqueous solution of a water-soluble anionic starch is added with the low molecular weight polymer in amount sufficient to supply 30 p.p.m. of the starch based on the total weight of the coal suspension. After standing two hours the height of the supernatent layer is 2.5 inches and the turbidity is 50 p.p.m. The starch thus acts as an auxiliary flocculant.

I claim:

1. Process for flocculating colloidal coal particles in aqueous alkaline medium, which consists essentially in distributing through said medium an effective flocculating amount between about 2 and 20 parts per million parts by weight of said medium of a low molecular weight water-soluble anionic polymer at least 50 mol percent composed of acrylic acid linkages and having a molecular weight between about 50,000 and 500,000 and a water-soluble anionic high molecular weight polymer at least about 95 mol percent composed of acrylamide linkages and having a molecular weight in excess of about 5 million, and adjusting the pH of said medium to a value below 7.

2. A process according to claim 1 wherein the low molecular weight polymer is composed of acrylic acid and acrylamide linkages in about 70:30 molar ratio.

3. The process according to claim 1 wherein the low molecular weight polymer has a molecular weight of about 200,000.

4. A process according to claim 1 wherein the high molecular weight polymer is composed of acrylamide and acrylic acid linkages in at least about 99:1 molar ratio.

5. A process according to claim 1 wherein the high molecular weight polymer has a molecular weight of 10 to 15 million.

6. A process according to claim 1 wherein the low molecular weight polymer is added prior to the high molecular weight polymer.

7. A process according to claim 1 wherein the pH of said medium is adjusted to a value between 6 and 7 prior to addition of said polymers.

8. A process according to claim 1 wherein the pH of said medium is adjusted by addition of sulfuric acid.

9. A process according to claim 1 wherein the pH of the medium is adjusted by addition of alum.

10. A process according to claim 1 wherein an effective amount in the range of 2 to 40 parts by weight per million parts by weight of said medium of a water-soluble anionic starch is added as supplementary flocculant.

* * * * *